United States Patent [19]

Mullaney

[11] Patent Number: 4,992,627
[45] Date of Patent: Feb. 12, 1991

[54] TELECOMMUNICATIONS TERMINAL HOUSING AND METHOD OF ENCLOSING A TELECOMMUNICATIONS TERMINAL WITH A MINIMUM CLEARANCE OPENING CONTAINER

[75] Inventor: Julian S. Mullaney, Raleigh, N.C.

[73] Assignee: Raychem Corporation, Menlo Park, Calif.

[21] Appl. No.: 395,862

[22] Filed: Aug. 18, 1989

[51] Int. Cl.⁵ .................... H02G 7/00; H02G 15/113
[52] U.S. Cl. ........................................ 174/41; 174/92; 220/213; 220/339
[58] Field of Search ............... 174/41, 44, 59, 60, 174/92; 220/213, 252, 334, 335, 339

[56] References Cited

U.S. PATENT DOCUMENTS 2,713,368  7/1955  Thomas .................... 220/339 X
4,578,702  3/1986  Campbell, III ............. 174/59 X Primary Examiner—Laramie E. Askin
Attorney, Agent, or Firm—A. Stephen Zavell; Herbert G. Burkard

[57] ABSTRACT

An enclosure especially suitable for telecommunications applications. The opening and closing of the cover of the enclosure is about an axis that permits the installation of the enclosure in environments requiring a minimum of clearance. More specifically, the cover is affixed to a side of a base member of the enclosure opposite to an open face; and the cover has a centrally located hinge which permits the cover to rotate closely about the axis of the open face.

14 Claims, 6 Drawing Sheets

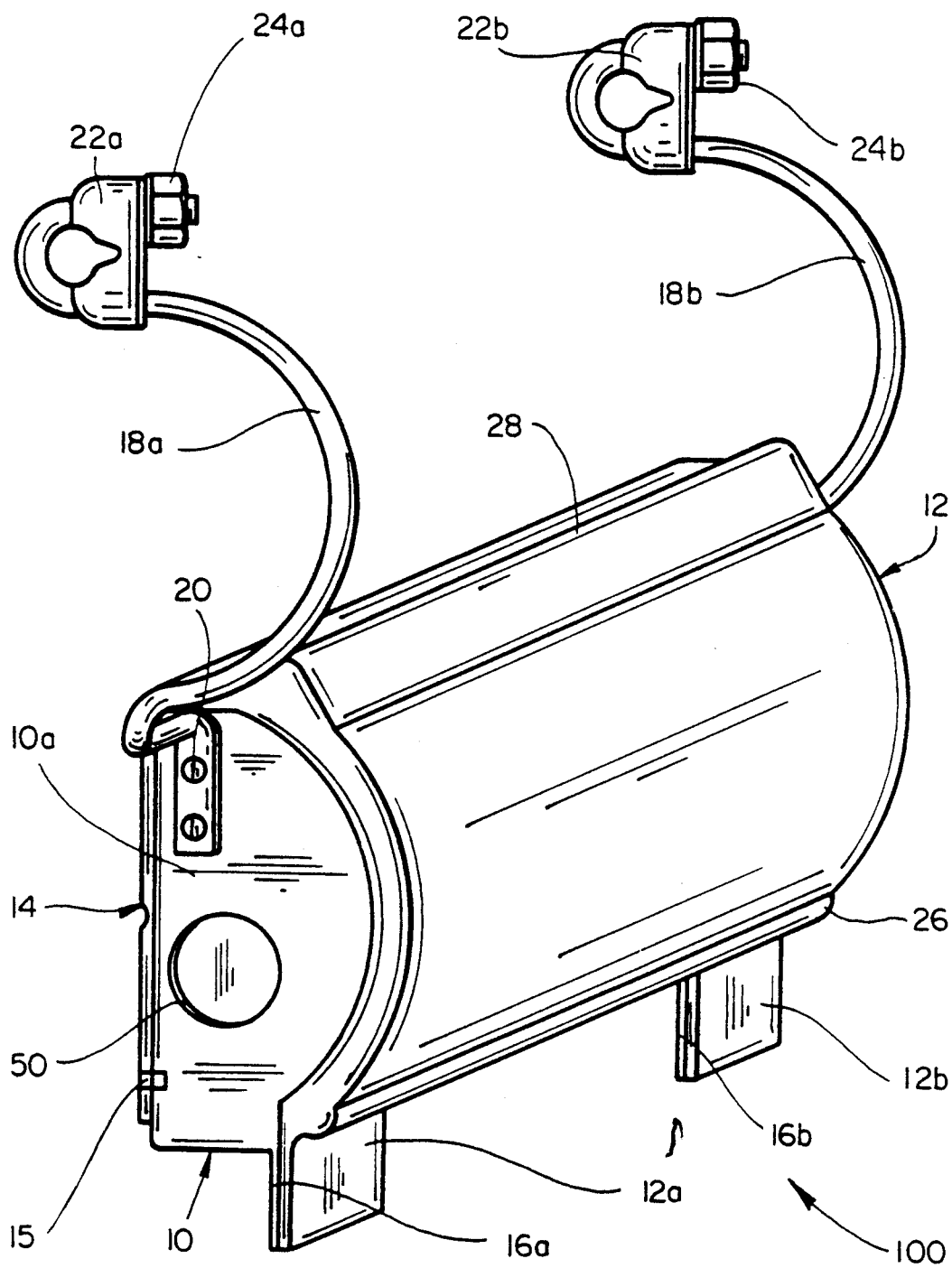
FIG_1A

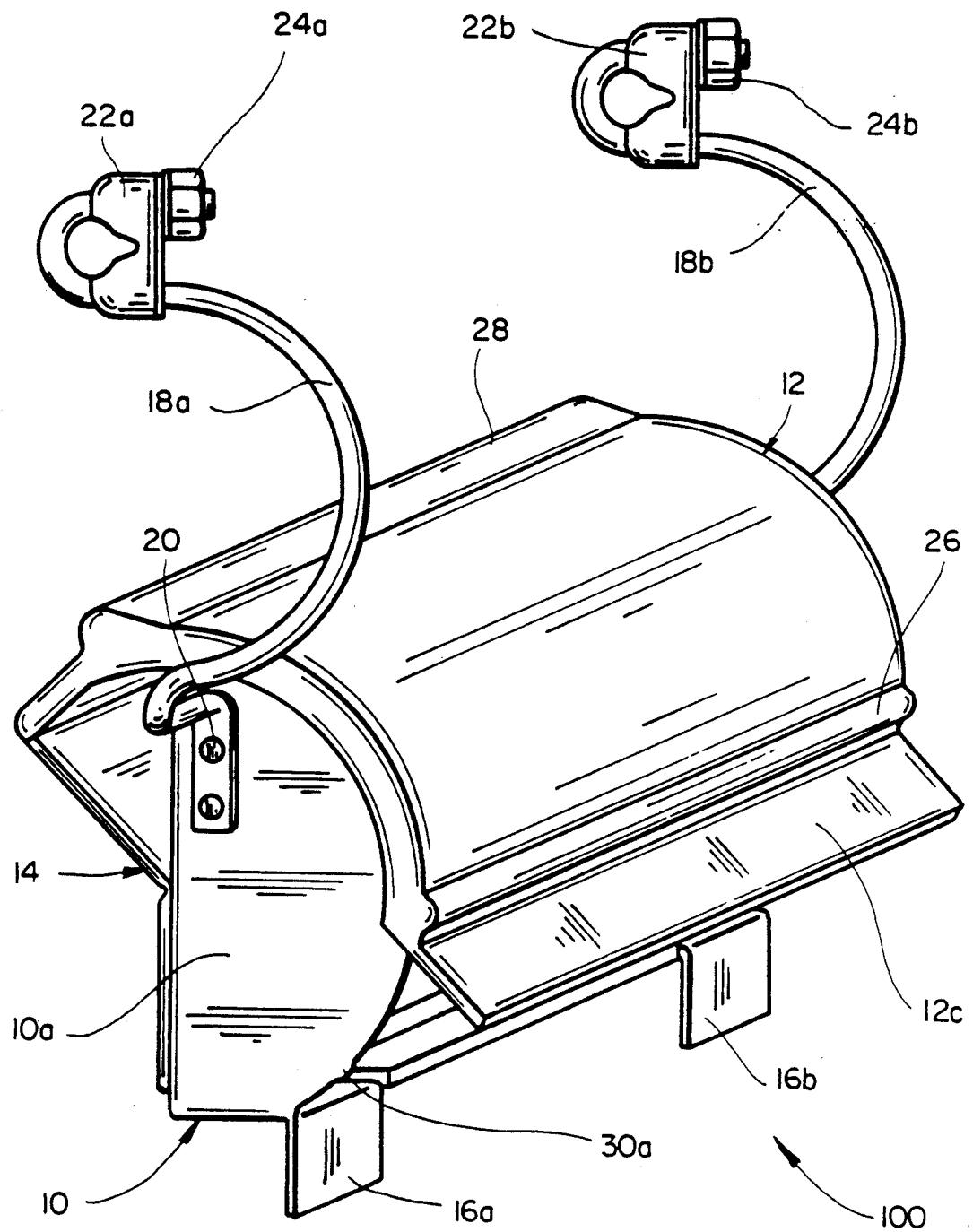
FIG_1B

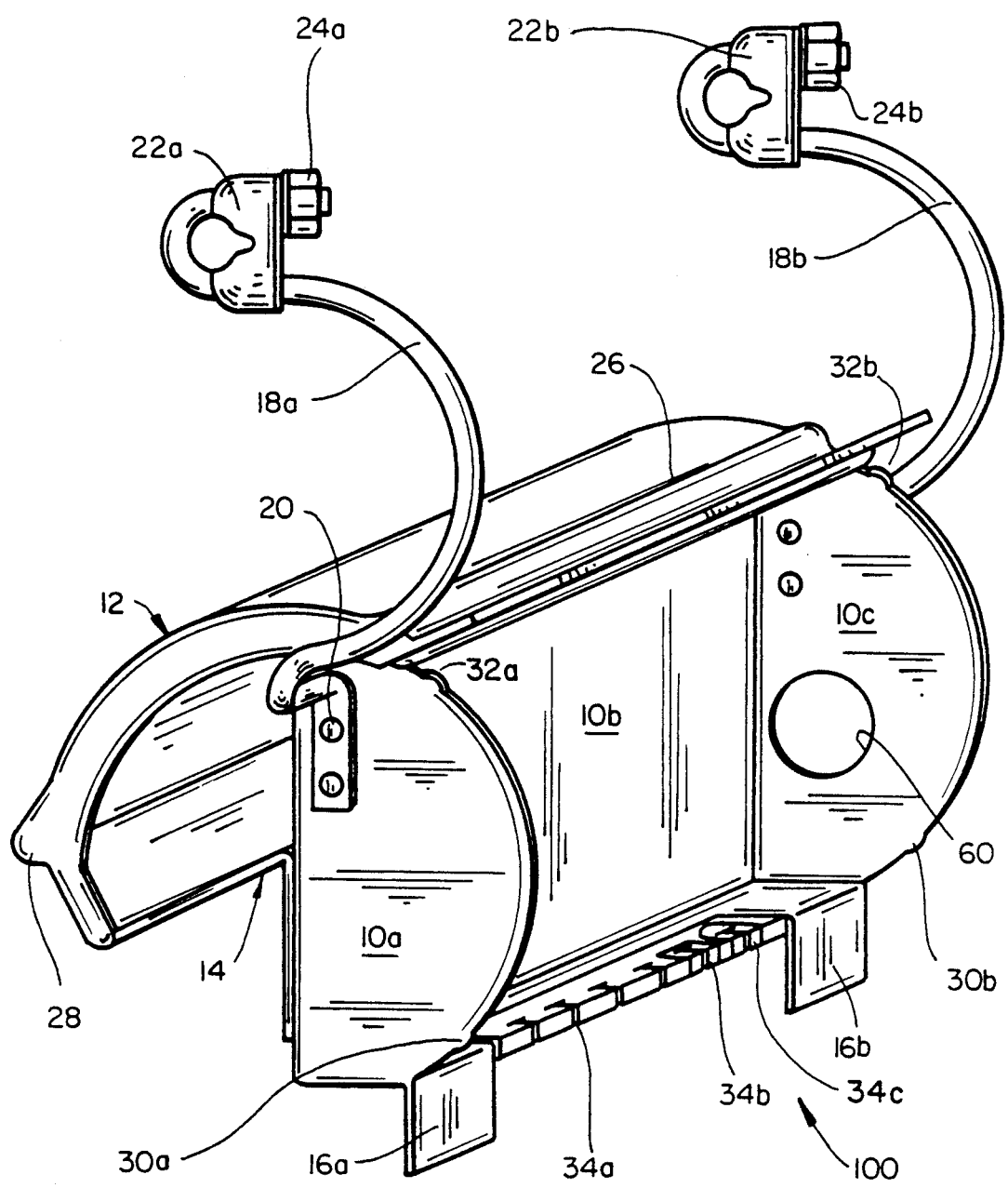
FIG_1C

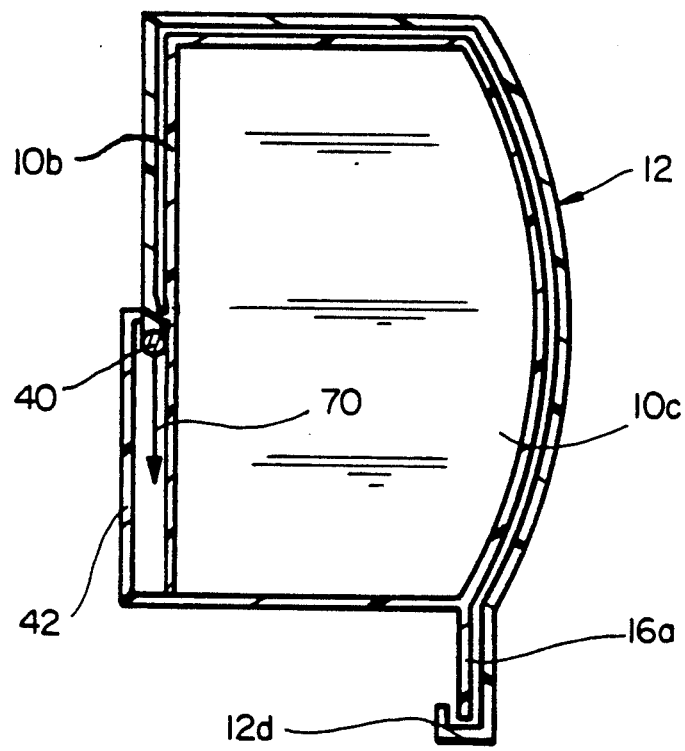
FIG_2

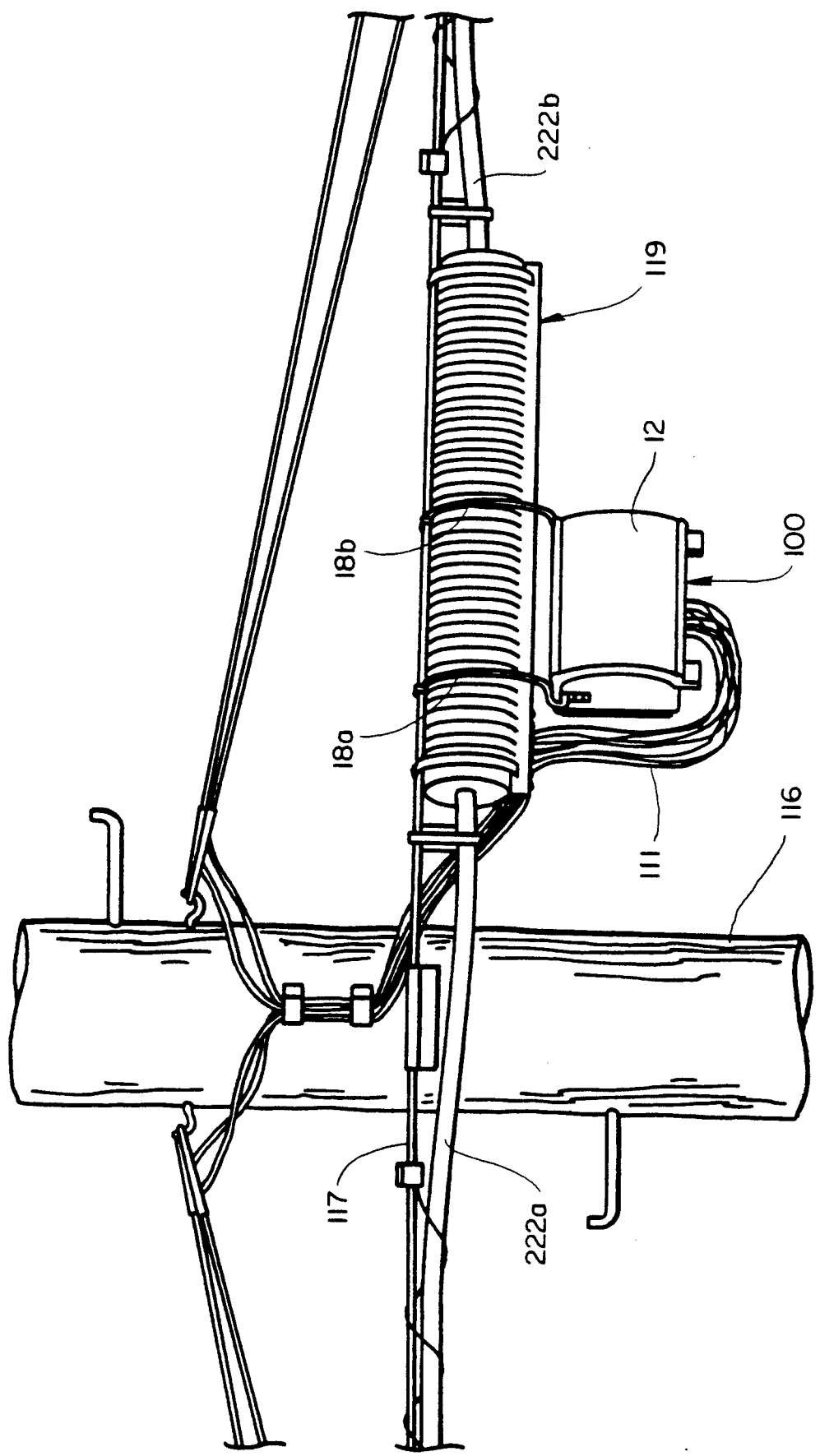
FIG_3

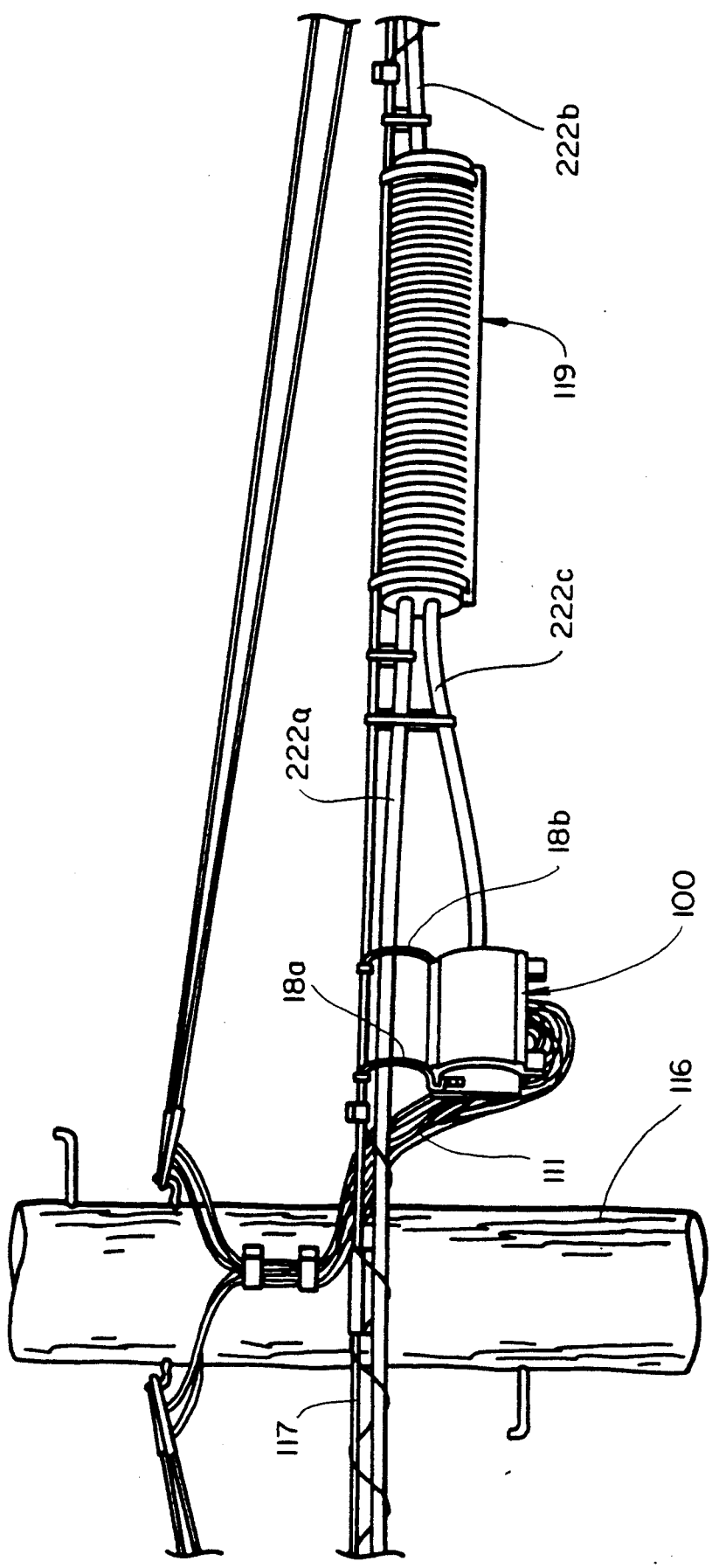

TELECOMMUNICATIONS TERMINAL HOUSING AND METHOD OF ENCLOSING A TELECOMMUNICATIONS TERMINAL WITH A MINIMUM CLEARANCE OPENING CONTAINER

BACKGROUND OF THE INVENTION

The invention relates to telecommunications terminal enclosures. More specifically, the invention relates to aerial enclosures for telecommunications terminal blocks.

In many parts of the world, telephone cables are strung above ground from a central office on to the customers. At various points along the telephone cable, connections to customers' homes are made by splicing into the cable with a drop wire. The drop wire connections are made at an aerial terminal block which is spliced into the main cable. Telephone repairmen, and/or installers gain access to the terminals by climbing the telephone poles. When in the air, the repairman often times does not have a great deal of room within which to work and must use at least one hand to hold a fixed position safely above the ground. Conventional aerial terminal boxes generally open outward and downward or outward and upward. The swinging action of the doors requires the installer to back away from the terminal upon opening and closing. This often causes the installer to be out of balance.

A solution to this problem is taught in U.S. Pat. application No. 07/130,348 filed Dec. 8, 1987 now U.S. Pat. No. 4,908,482 issued Mar. 13, 1990 which is completely incorporated herein by reference for all purposes. The enclosure utilize concentric cylinders which rotate about the central axis of the interior cylinder. Although this configuration solves all the "backing away" problems, it provides limited access to the terminal. The enclosure also does not permit maximum space efficiency. Thus, it would be highly desirable to have a terminal housing which provides the desirable features of a cylindrical enclosure while permitting greater access to the terminal and more useable space.

SUMMARY OF THE INVENTION

The enclosure of the invention has the previously recited desirable features and many additional attributes readily apparent to the ordinary skilled artisan. The invention provides for a telecommunications terminal container which opens about an axis while provided easy and wide open access to the telecommunications terminal and the like contained within the enclosure.

The invention also provides for a method of enclosing telecommunication terminals or other devices wherein the enclosure can be placed immediately adjacent another object without impeding or hindering the opening of the enclosure. The invention further includes a kit-of-parts capable of being assembled into the enclosure.

BRIEF DESCRIPTION OF THE DRAWINGS

FIG. 1a is an oblique illustration of a closure embodiment of the invention.

FIG. 1b is an oblique illustration of an embodiment of the invention partially open.

FIG. 1c is an oblique illustration of an embodiment of the invention in the completely open position.

FIG. 2 is a sectional view of an alternative hinging embodiment.

FIG. 3 is an illustration of the closure of the invention installed below an aerial cable splice.

FIG. 4 is an illustration of the closure of the invention installed on a telephone guide wire.

DETAILED DESCRIPTION OF THE INVENTION

The invention will be more particularly described with reference to the figures which highlight the concepts and particular embodiments of the invention. With reference to FIGS. 1a, 1b, and 1c, the enclosure is illustrated as cable enclosure 100. Cable enclosure 100 has a base member 10 forming an open rectangular box-like structure having semicuircular "D" shaped end pieces 10a and 10c and a side 10b opposite to the opening. Affixed to the base member 10 is a cover 12. The cover is attached to the base member side 10b at 15 through nuts, bolts, screws, rivets, welding, and the like.

The cover 12 has a hinge 14 located on base member side 10b opposite to the opening. The hinge 14 can be metal or plastic if the cover 12 is fabricated from a flexible material such as plastic like polypropylene. Alternatively, the base member 10 and the cover 12 and the hinge 14 can be injection molded as one piece. As a one piece unit, the side members 10a and 10c are split into upper and lower portions along a line preferably extending from the hinge 14 to the tabs 12a, 12b, 16a, 16b.

The cover 12 further includes tabs 12a and 12b which lock with tabs 16a and 16b on the base member 10. Any suitable clip, clasp, nut, bolt, and the like can be used to close the cover 12 on the base member 10 at 12a/16a and 12b/16b. Alternatively, the tabs 12a and 12b can be a single long unitary piece as illustrated in FIG. 1b as a tab 12c. Furthermore, the tabs 16a and 16b optionally can also be a unitary piece, not illustrated.

The cover 12 further includes optional indentations 26 and 28 for assisting the locking of the closure in both the open and closed position. The indentation 26 in cover 12 snaps onto the protrusions 32a and 32b in the base 10, illustrated in FIG. 1c, when the cover is open. The indentations 26 and 28 in the cover 12 also snap onto protrusions 30a/30b and 32a/32b, respectively, when the cover is closed.

As can be seen in the sequential FIGS. 1a, 1b, and 1c, the cover opens by rotating about the hinge 14 and maintaining a low profile with repsect to the base member 10. Optionally, the hinge 14 is located slightly below the curved part of the cover 12 to maintain an interference fit between the base member 10 and the cover 12. The hinge location permits the enclosure 100 to be mounted closely underneath an aerial splice 119 in FIG. 3 and/or separately but close to a guiding wire 117 as illustrated in FIG. 4.

The enclosure 100 includes an opening 50 or 60, optionally with a sealing gromment for a cable. The enclosure 100 includes individual slotted grommets 34a, 34b, and 34c in base member 10. Optionally, the grommets, as illustrated, may be part of a unitary bar or press-fit as illustrated by 34c or molded around an appropriate metal plate as illustrated by 34b. Unitary piece grommets are illustrated by 34a. In a particularly preferred embodiment, the grommets are inverted "T" shape such that the drop wire laterally inserted and then turned laterally cannot be pulled out again, thus locking the drop wire in place. Alternatively, standard push-through grommets can be utilized in the closure if the side entry feature is not required. To connect the enclosure 100 to a cable, hanging members 18a and 18b are fixed, i.e., riveted, bolted, or firmly secured by means 20 to the closure base member 10. The illustrated hangers 18a, 18b curved to hang around a splice closure 119 as illustrated in FIG. 3 and bolted to the supporting wire 117 by meansof bolts and nuts 24a and 24b holding clamps 22a and 22b, or other suitable means. The hangers 18a and 18b can be metallic to provide for an electrical ground between the enclosure, the items within the enclosure such as a terminal block and the supporting wire illustrated as 117 in FIGS. 3 and 4.

A further embodiment is illustrated in FIG. 2. The side member 10a includes a track or long "U" shaped member 42. Member 42 connects to side 10b at or just below geometric center for the cover 12. The cover 12 includes a bar 40 or other suitable member capable of moving within the opening between the member 42 and the base 10b or track in a direction as illustrated by arrow 70. This maintains a close and low profile fit of the cover 12 upon opening. Also illustrated in FIG. 2 are optional snap closures 12d to snap close to the tabs 16a and 16b. Preferably the snap closures have a "J" shape, as illustrated fabricated from a suitably flexible material such as plastic.

FIGS. 3 and 4 illustrate some uses of the enclosure 100 where a close fit is required to either a guide wire 117 or an aerial splice 119 for cables 222a and 222b. In FIG. 3 the enclosure 100 has drop wire 111 going to the customer from the telephone pole 116. The enclosure is connected to the guide wire 117 with the hangers 18a and 18b. The cover 12 rotates open under the splice closure 119. FIG. 4 illustrates cable 222c from an aerial splice 119 entering the enclosure 100 through the hole 60, not visible. The enclosure 100 will contain a terminal block also not visible to permit the connection of the drop wire 111 thereto. Suitable examples of terminal blocks are disclosed in application Ser. No. 231,755 filled Aug. 12, 1988 (now abandoned). The application is completely incorporated herein by reference for all purposes. Optionally, the enclosure 100 can be divided into an accessible portion with a terminal block and a sealed portion containing a cable splice in electrical contact with the terminal blocks.

The invention has been described with respect to particularly preferred embodiments. Modifications which would be obvious to one of ordinary skill in the art are contemplated to be within the scope of the invention.

I claim:

1. An apparatus for enclosing an article comprising:
   a base member defining an enclosure, said base member having an open face providing access to the enclosure; and
   a cover affixed to a side of the base member opposite to the open face, said cover having a centrally located hinge on the side opposite to the open face thus providing for the cover to rotate about an axis of the open face.

2. The apparatus according to claim 1 wherein each side portion of the base member adjacent to the open face has a "D" shape.

3. The apparatus according to claim 2 wherein the hinge is located at the geometric center of a curved portion of the cover such that when the cover is opened and closed, it maintains a low profile with the "D" shaped side portions of the base member.

4. The apparatus according to claim 3 wherein the hinge is located to provide an interference fit between the cover and the base member upon opening and closing.

5. The apparatus according to claim 3 further comprising means for mounting the enclosure to a cable.

6. The apparatus according to claim 3 wherein the enclosure further includes slots in a side of the base member for accepting drop wires.

7. The apparatus according to claim 6 wherein the slots are located along a side portion of the base member perpendicular to the "D" shape side portions and perpendicular to the side with the hinge.

8. The apparatus according to claim 7 wherein the hinge is slideable and moves towards the slots upon the opening of the cover.

9. The apparatus according to claim 6 wherein the slots have an inverted "T" shape.

10. The apparatus according to claim 2 wherein the cover snaps closed to the base member.

11. An apparatus enclosing a
    telecommunications terminal block comprising:
    a base member defining an enclosure, said base member having an open face providing access to the enclosure;
    a cover affixed to a side of the base member opposite to the open face, said cover having a centrally located hinge on the side opposite to the open face thus providing for the cover to rotate about an axis of the open face; and
    wherein the telecommunications terminal block is within the enclosure.

12. A process of enclosing a telecommunications terminal block comprising:
    mounting a telecommunications terminal block in a base member having an open side;
    affixing a cover to the base member opposite to the open side, said cover having a hinge centrally located opposite to the open side; and
    closing the cover about the opening from the centrally located hinge.

13. A kit-of-parts for a telecommunications enclosure comprising:
    a base member having an opening; and
    a cover capable of covering the opening, said cover attaching to said base member on the side of the base member opposite to the opening, said cover having a hinge located at the geometric center of the cover such that the opening and closing of the cover is achieved through a rotation about the axis of the hinge in order to maintain a close fit to the base member.

14. The kit-of-parts according to claim 13 further including hangers to affix the enclosure to a cable.

* * * * *